US011597553B2

(12) United States Patent
Mancin et al.

(10) Patent No.: US 11,597,553 B2
(45) Date of Patent: Mar. 7, 2023

(54) ASSEMBLY FOR PRODUCING SEALED PACKAGING UNITS

(71) Applicant: Tetra Laval Holdings & Finance S.A., Pully (CH)

(72) Inventors: Thomas Sergio Mancin, Modena (IT); Gabriele Schiavi, Zola Predosa (IT); Luca Gentili, Ascoli Piceno (IT); Ivan Orsini, Formigine (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 98 days.

(21) Appl. No.: 16/096,993

(22) PCT Filed: Apr. 12, 2017

(86) PCT No.: PCT/EP2017/058794
§ 371 (c)(1),
(2) Date: Oct. 26, 2018

(87) PCT Pub. No.: WO2017/186493
PCT Pub. Date: Nov. 2, 2017

(65) Prior Publication Data
US 2019/0135470 A1 May 9, 2019

(30) Foreign Application Priority Data
Apr. 28, 2016 (EP) .................... 16167410

(51) Int. Cl.
*B31B 50/64* (2017.01)
*B65B 9/20* (2012.01)
(Continued)

(52) U.S. Cl.
CPC .............. *B65B 51/30* (2013.01); *B29C 65/08* (2013.01); *B29C 65/745* (2013.01);
(Continued)

(58) Field of Classification Search
CPC .... B31B 50/644; B31B 50/645; B65B 9/2049
(Continued)

(56) References Cited

U.S. PATENT DOCUMENTS 3,894,381 A     7/1975   Christine et al.
5,976,315 A * 11/1999   Martin .................... B29C 65/08
                                                                                               156/580.2
(Continued)

FOREIGN PATENT DOCUMENTS

CN     101213069 A    7/2008
CN     101262999 A    9/2008
(Continued)

OTHER PUBLICATIONS

International Search Report in corresponding PCT Application No. PCT/EP2017/058794 dated Apr. 7, 2017 (3 pages).
(Continued)

*Primary Examiner* — Thanh K Truong
*Assistant Examiner* — Patrick B Fry
(74) *Attorney, Agent, or Firm* — Finnegan, Henderson, Farabow, Garrett & Dunner LLP (57) ABSTRACT

An assembly for producing sealed packaging units (14) from a sheet packaging material, comprises: an advancement device (21) for advancing the sheet packaging material along an advancement direction (F), a longitudinal sealing device for sealing opposite borders of the sheet packaging material along a longitudinal sealing band arranged parallelly to the advancement direction (F), thereby forming a continuous tube (15), a transverse sealing device (29) for sealing the continuous tube (15) transversely to the advancement direction (F), so as to define a sealed packaging unit (14). The transverse sealing device (29) comprises a sealing element (30) and an abutment element (31) that are intended to mutually cooperate during sealing while being located on (Continued)

opposite sides of the continuous tube (15). The sealing element (30) is so configured as to act on a side (27) of the continuous tube (15) on which the longitudinal sealing band is provided.

13 Claims, 4 Drawing Sheets (51) Int. Cl.
| | | |
|---|---|---|
| B65B 9/213 | (2012.01) | |
| B65B 51/22 | (2006.01) | |
| B65B 51/30 | (2006.01) | |
| B29C 65/08 | (2006.01) | |
| B29C 65/00 | (2006.01) | |
| B65D 5/74 | (2006.01) | |
| B65B 61/18 | (2006.01) | |
| B29C 65/78 | (2006.01) | |
| B31B 50/84 | (2017.01) | |
| B29C 65/74 | (2006.01) | |
| B65B 9/207 | (2012.01) | |
| B65B 61/06 | (2006.01) | |
| B29L 31/00 | (2006.01) | |
| B29K 705/02 | (2006.01) | |
| B29C 65/48 | (2006.01) | |
| B31B 100/00 | (2017.01) | |
| B31B 110/35 | (2017.01) | |
| B31B 50/82 | (2017.01) | |
| B65B 55/04 | (2006.01) | |

(52) U.S. Cl.
CPC ...... *B29C 65/7451* (2013.01); *B29C 65/7891* (2013.01); *B29C 66/1122* (2013.01); *B29C 66/346* (2013.01); *B29C 66/4312* (2013.01); *B29C 66/4742* (2013.01); *B29C 66/723* (2013.01); *B29C 66/72321* (2013.01); *B29C 66/72341* (2013.01); *B29C 66/83543* (2013.01); *B29C 66/8491* (2013.01); *B31B 50/644* (2017.08); *B31B 50/645* (2017.08); *B31B 50/84* (2017.08); *B65B 9/207* (2013.01); *B65B 9/213* (2013.01); *B65B 51/225* (2013.01); *B65B 61/06* (2013.01); *B65B 61/186* (2013.01); *B65D 5/746* (2013.01); *B29C 65/48* (2013.01); *B29C 66/4322* (2013.01); *B29C 66/71* (2013.01); *B29C 66/72328* (2013.01); *B29C 66/73921* (2013.01); *B29C 66/8167* (2013.01); *B29C 66/81413* (2013.01); *B29C 66/81431* (2013.01); *B29K 2705/02* (2013.01); *B29L 2031/7166* (2013.01); *B31B 50/642* (2017.08); *B31B 50/82* (2017.08); *B31B 2100/0022* (2017.08); *B31B 2110/35* (2017.08); *B65B 55/04* (2013.01)

(58) Field of Classification Search
USPC .................................................. 53/550, 551
See application file for complete search history.

(56) References Cited

U.S. PATENT DOCUMENTS

| | | | | |
|---|---|---|---|---|
| 7,059,100 B2* | 6/2006 | Babini | ............... | B29C 65/7451 |
| | | | | 53/376.2 |
| 7,600,360 B2* | 10/2009 | Schroeder | ............... | B65B 9/093 |
| | | | | 53/452 |
| 8,201,606 B2* | 6/2012 | Specht | .................... | B29C 65/08 |
| | | | | 156/515 |
| 8,607,535 B2* | 12/2013 | Karlsson | ............. | B29C 66/8221 |
| | | | | 53/451 |
| 8,839,597 B2* | 9/2014 | Babini | .................. | B29C 66/232 |
| | | | | 53/551 |
| 9,352,869 B2* | 5/2016 | Babini | .................. | B29C 65/368 |
| 2002/0170273 A1 | 11/2002 | Kohl et al. | | |

FOREIGN PATENT DOCUMENTS

| | | |
|---|---|---|
| CN | 102369097 A | 3/2012 |
| EP | 1 241 099 | 9/2002 |
| EP | 2 236 270 | 10/2010 |
| EP | 2 468 480 | 6/2012 |
| EP | 2 662 291 | 11/2013 |
| EP | 3 000 584 | 3/2016 |
| JP | H05-330551 A | 12/1993 |
| JP | 2011-530455 A | 12/2011 |
| WO | WO 2010/018141 A1 | 2/2010 |

OTHER PUBLICATIONS

Chinese Office Action in corresponding Chinese Application No. 201780025694.6 dated Jul. 2, 2020 (8 pages).

* cited by examiner

ASSEMBLY FOR PRODUCING SEALED PACKAGING UNITS

CROSS-REFERENCE TO RELATED PATENT APPLICATIONS

This is a National Phase of International Application No. PCT/EP2017/058794, filed Apr. 12, 2017, which claims the benefit of European Application No. 16167410.6 filed Apr. 28, 2016. The entire contents of the above-referenced applications are expressly incorporated herein by reference.

TECHNICAL FIELD

The invention relates to an assembly for producing sealed packaging units from a sheet packaging material. The sealed packaging units produced by the assembly according to the invention can be subjected to further folding operations so as to obtain sealed packages containing a product, particularly a pourable food product.

BACKGROUND OF INVENTION

As is known, many pourable food products, such as fruit juice, UHT (ultra-high-temperature treated) milk, wine, tomato sauce, etc., are sold in packages made of sheet packaging material.

For example, parallelepiped-shaped packages for liquid or pourable food products are known, which are made by folding and sealing laminated sheet packaging material. The packaging material has a multilayer structure comprising a base layer, e.g. of paper, covered on both sides with layers of heat-sealable plastic material, e.g. polyethylene. In the case of aseptic packages for long-storage products, such as UHT milk, the packaging material also comprises a layer of oxygen-barrier material, e.g. an aluminium foil, which is superimposed on a layer of heat-sealable plastic material, and is in turn covered with another layer of heat-sealable plastic material forming the inner face of the package eventually contacting the food product.

The package is produced starting from a basic unit of packaging material, which is normally conformed as a portion of a sheet of packaging material advanced through a packaging machine along an advancement direction.

If there is the need to produce a sterilized package, the sheet of packaging material is sterilized on the packaging machine, and subsequently maintained in a closed, sterile environment.

In any event, opposite longitudinal borders of the sheet packaging material are sealed together along a longitudinal sealing band to form a continuous tube, which is filled with the desired product.

The tube is advanced on the packaging machine by a plurality of pairs of jaws. Each pair of jaws is provided with a transverse sealing device for sealing the tube along a transverse sealing band arranged transversely to the advancement direction. In particular, the transverse sealing device comprises a sealing element interacting with the sheet packaging material in order to seal opposite ends of the sheet packaging material along the transverse sealing band and an abutment element, opposite the sealing element, against which the sheet packaging material is pressed during sealing. When the packaging material forming the continuous tube is clamped between the abutment element and the sealing element, the abutment element faces a side of the continuous tube on which the longitudinal sealing band is obtained. The sealing element faces the other side of the continuous tube, i.e. the side that is free of the longitudinal sealing band.

In certain cases, the containers described above can be provided with respective reclosable opening devices made of plastic material. A reclosable opening device comprises a pouring spout, defining a through pouring opening and fitted to a hole in a top wall of the container. The pouring spout has a neck, for example threaded, which during use protrudes from the top wall. A removable lid, e.g. a screw lid, is subsequently fitted to the pouring spout in order to outwardly close the latter.

The pouring spout is applied onto the sheet packaging material as the latter is advanced through the packaging machine, before longitudinally sealing the sheet packaging material to obtain the continuous tube therefrom. The pouring spout may be, for example, moulded on the sheet packaging material before folding the latter.

Hence, when the transverse sealing device interacts with the sheet packaging material, the latter is already provided with a plurality of pouring spouts. In particular, the pouring spouts are applied to the side of the continuous tube opposite the further side of the continuous tube provided with the longitudinal sealing band, i.e. on a portion of the sheet packaging material facing the transverse sealing element.

When a continuous tube provided with the pouring spouts is to be sealed by the transverse sealing device, the neck of each pouring spout may interfere with the sealing element. If this occurs, the sealing element may deform the neck or even break the latter, which makes it difficult if not impossible to apply the lid on the neck on a subsequent capping machine.

In case interference occurs between the neck and the sealing element, also the package may be damaged due to excessive pressures applied thereto.

In order to avoid these risks, it has been thought to obtain on the sealing element of the transverse sealing device a recess for housing the neck while the continuous tube is being sealed transversely to the advancement direction. However, this solution cannot be adopted on all kinds of packaging machines. For example, if the packaging machine is provided with a transverse sealing device of an ultrasonic type, the sealing element is a sonotrode that needs to have a minimum vibrating mass in order to ensure proper sealing of the sheet packaging material. In this case, providing a recess on the sealing element, which decreases the mass thereof, may jeopardize tightness of the transverse sealing band.

More in general, providing a recess on certain kinds of sealing elements may be difficult since it would excessively complicate the structure of the sealing element.

DISCLOSURE OF INVENTION

An object of the invention is to improve existing assemblies for producing from a sheet packaging material a plurality of sealed packaging units, either separated one from another or still attached one to another to form a sort of web.

Another object is to provide an assembly that ensures a high sealing quality even when producing sealed packaging units provided with a pouring spout having a neck.

A further object is to provide an assembly that is capable of producing sealed packaging units with a high sealing quality, without excessively complicating the structure of the sealing elements.

Still a further object is to provide an assembly that ensures a high sealing quality with different types of sealing elements, in particular also with sealing elements of an ultrasonic type.

According to the invention, there is provided an assembly for producing sealed packaging units from a sheet packaging material, comprising:

- an advancement device for advancing the sheet packaging material along an advancement direction,
- a longitudinal sealing device for sealing opposite borders of the sheet packaging material along a longitudinal sealing band arranged parallelly to the advancement direction, thereby forming a continuous tube,
- a transverse sealing device for sealing the continuous tube transversely to the advancement direction, so as to define a sealed packaging unit, wherein the transverse sealing device comprises a sealing element and an abutment element that are intended to mutually cooperate during sealing while being located on opposite sides of the continuous tube, the sealing element being so configured as to act on a side of the continuous tube on which the longitudinal sealing band is provided.

Since the sealing element is so positioned as to act on the side of the continuous tube on which the longitudinal sealing band is provided, the abutment element is consequently so positioned as to act on a further side of the continuous tube opposite the longitudinal sealing band. This makes it easier, if necessary, to modify the structure and/or conformation of the component of the transverse sealing device facing the further side of the continuous tube opposite the longitudinal sealing band.

For example, if the sheet packaging material is provided with a pouring spout applied on a side of the continuous tube opposite the longitudinal sealing band, the abutment element can be specifically designed so as to avoid interference with the neck. This is much easier than modifying the sealing element of the prior art.

A high sealing quality can thus be ensured.

In an embodiment, the transverse sealing device has a recess for housing a neck of a pouring spout provided on the continuous tube.

The recess can be at least partially made in the abutment element.

The recess allows interference between the neck of the pouring spout and the transverse sealing device to be avoided during sealing. By housing the neck into the recess during sealing, it is ensured that the neck is not deformed by portions of the transverse sealing device or of other components located near the transverse sealing device. Hence, the risk that the lid cannot be properly applied onto the pouring spout due to undesired deformations of the neck while handling the continuous tube is substantially eliminated.

Similarly, the risk of breaking the neck or deforming the sealed packaging unit is substantially avoided.

In an embodiment, the transverse sealing device is an ultrasonic sealing device and the sealing element is a sonotrode.

By using an ultrasonic sealing device, a high quality seal can be obtained even if the sheet packaging material does not comprise electrically conducting layers.

In an embodiment, the assembly further comprises a cutting device for cutting the continuous tube so as to separate therefrom consecutive sealed packaging units. The cutting device may be integrated in the transverse sealing device.

The cutting device may comprise a cutting element so configured as to face a further side of the continuous tube opposite the side on which the longitudinal sealing band is provided.

The cutting element may be at least partially housed in the abutment element.

The cutting device cuts the packaging material forming the continuous tube through the transverse sealing band, so that subsequent sealed packaging units may be separated from the continuous tube.

In an embodiment, the advancement device comprises a pair of gripping jaws movable between a gripping position, in which the sheet packaging material is clamped between the two gripping jaws of the pair, and a disengagement position, in which the gripping jaws are distanced one from another and from the sheet packaging material, so that the sheet packaging material may be advanced relative to the gripping jaws.

In an embodiment, the transverse sealing device is integrated in the gripping jaws of the pair.

In particular, the sealing element may be provided on the gripping jaw facing the side of the continuous tube having the longitudinal sealing band, whereas the abutment element may be provided on the other gripping jaw.

The packaging material forming the continuous tube may thus be sealed transversely to the advancement direction while the continuous tube is being advanced along the advancement direction.

High production speeds can consequently be achieved.

BRIEF DESCRIPTION OF THE DRAWINGS

The invention will be better understood and carried out with reference to the enclosed drawings, which illustrate an exemplifying and non limiting embodiment thereof, wherein.

DETAILED DESCRIPTION OF PREFERRED EMBODIMENTS

Figure 1:
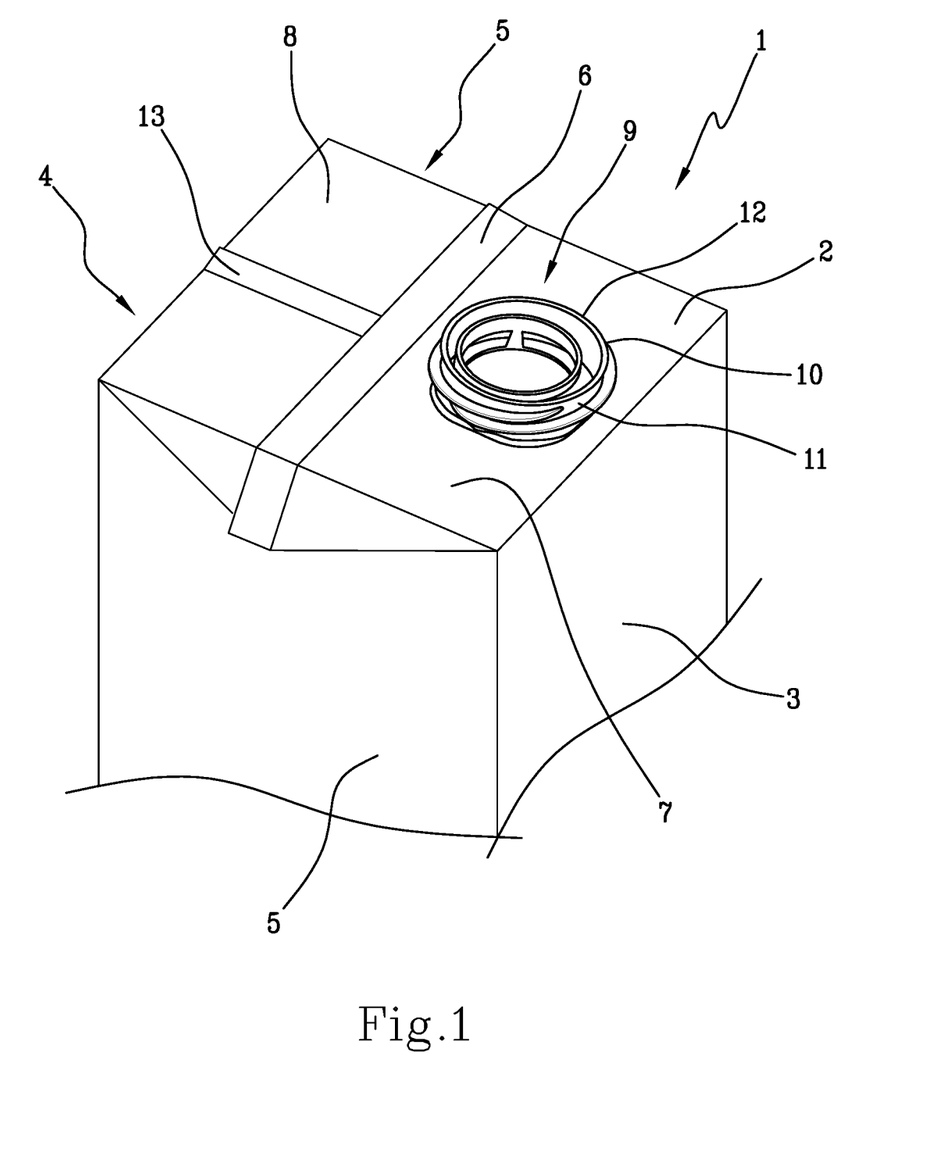
FIG. 1 is a perspective schematic view showing a portion of a sealed package provided with a reclosable opening device.

FIG. 1 shows an upper portion of a sealed package 1 particularly suitable for containing a pourable product, for example a pourable food product.

The package 1 may be produced by folding and sealing a basic unit made from a sheet packaging material. The basic unit may be a portion of a sheet packaging material comprising a succession of basic units.

The sheet packaging material has a multilayer structure comprising a base layer, e.g. of paper, for stiffness, and a number of lamination layers covering both sides of the base layer.

For example, the sheet packaging material may comprise a base layer interposed between at least two heat-sealable layers.

In an alternative embodiment, the lamination layers may comprise a first layer of oxygen-barrier material, e.g. an aluminium foil, and a number of second layers of heat-sealable plastic material covering both sides of both base layer and first layer. In other words, such solution comprises, in succession and from the side eventually forming the inside of a package, a layer of heat-sealable plastic material, a layer of barrier material, another layer of heat-sealable plastic material, a base layer, and another layer of heat-sealable plastic material.

Instead of comprising an aluminium foil, the oxygen-barrier layer may be made of a non-electrically conducting material, such as EVOH.

The package 1 comprises a bottom wall that is not shown, which during use is intended to rest on a supporting surface, such as a shelf or a table, and a top wall 2 opposite the bottom wall. In the example shown, the top wall 2 is tilted relative to the bottom wall. However, it is also possible that the bottom wall and the top wall 2 are parallel to one another.

The package 1 further comprises a front wall 3, which is interposed between the bottom wall and the top wall 2, and a back wall 4, opposite the front wall 3. Two side walls 5, which are opposite one another, are interposed between the front wall 3 and the back wall 4.

In the package 1 shown in FIG. 1, two opposite side walls 5 are parallel to one another. However, this condition is not essential and other shapes of the package 1 can be envisaged.

The package 1 further comprises a top transverse sealing band 6 that extends across the top wall 2, between opposite edges thereof. A similar bottom transverse sealing band, which is not shown in FIG. 1, extends across the bottom wall of the package 1, between opposite edges thereof.

The top transverse sealing band 6 divides the top wall 2 into a first wall portion 7 and a second wall portion 8. The first wall portion 7, which is adjacent to the front wall 3, defines an area on which an opening device 9, particularly a reclosable opening device, may be applied.

The opening device 9 comprises a pouring spout 10 that is fixed relative to the package 1. The pouring spout 10 may be applied onto the packaging material forming the package 1 before folding such packaging material, e.g. by moulding the pouring spout 10 directly on the sheet packaging material, or by other conventional fastening systems, such as adhesives, or by microflame, electric-current-induction, ultrasonic, laser, or other heat-sealing techniques.

The pouring spout 10 comprises a neck 11 protruding upwards from the top wall 2.

On the neck 11, a lid that is not shown may be applied after the package has been formed. The lid is removably connected to the neck 11, e.g. by means of a threaded connection.

The second wall portion 8, which is adjacent to the back wall 4, comprises, in a center region thereof, an end portion of a flat longitudinal sealing band 13 of the package 1.

More specifically, the longitudinal sealing band 13 extends perpendicularly between the top transverse sealing band 6 and the bottom transverse sealing band, and substantially along the centerline of the back wall 4.

Figure 2:
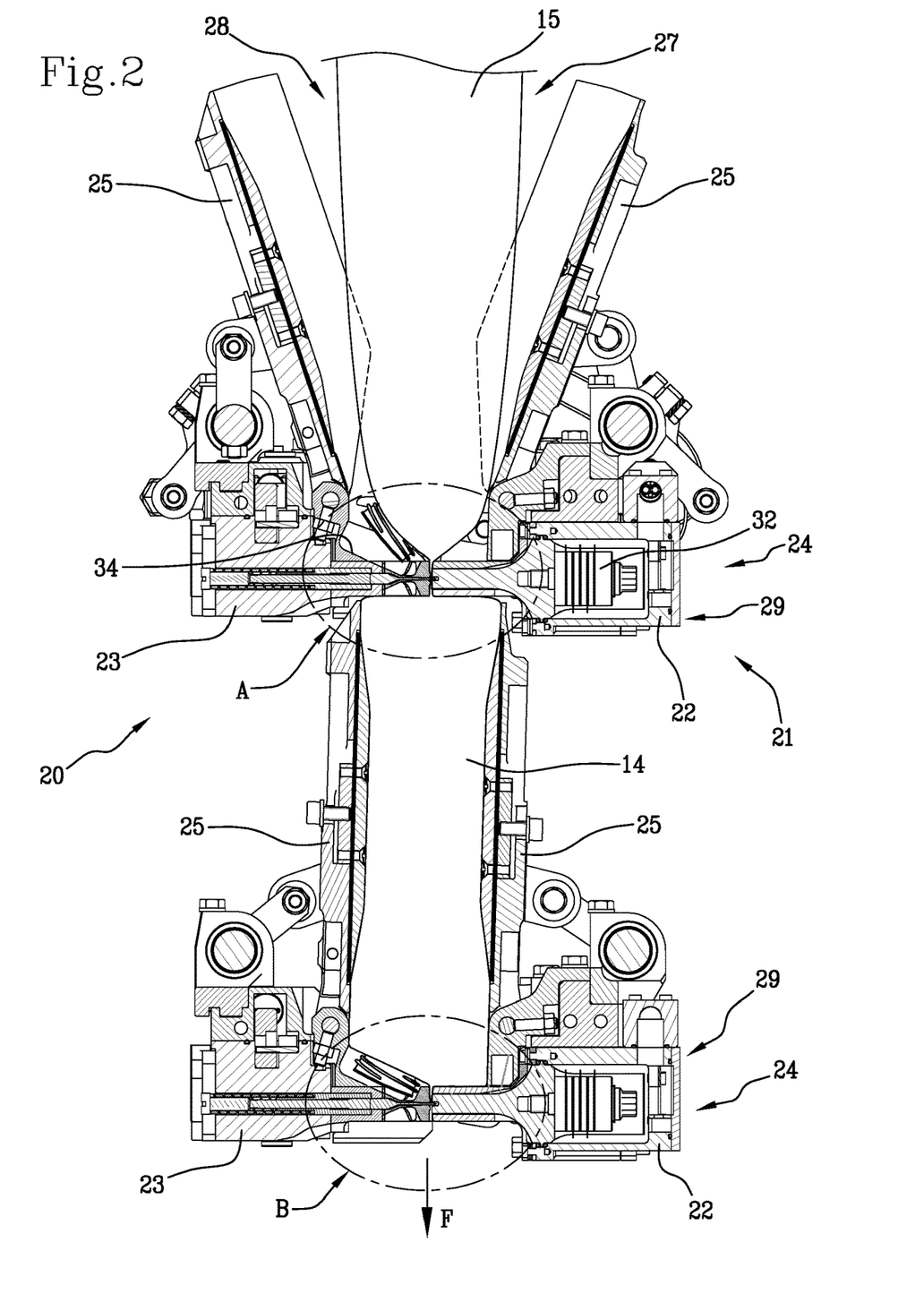
FIG. 2 is a cross-section showing an assembly for forming sealed packaging units from a sheet packaging material.

FIG. 2 shows an assembly 20 that can be used for producing sealed packaging units 14 from the sheet packaging material. The sealed packaging units 14 can then be subjected to further folding operations in a folding device that is not show, the folding device being located downstream of the assembly 20. In the folding device, a package 1 as shown in FIG. 1 is obtained from each sealed packaging unit 14.

The assembly 20 comprises an advancement device 21 for advancing the sheet packaging material along an advancement direction F. The advancement device 21 comprises two pairs 24 of gripping jaws, each pair of gripping jaws being configured to engage with a portion of the sheet packaging material intended to form an end region of the sealed packaging unit 14.

In particular, each pair 24 of gripping jaws comprises a first jaw 22 and a second jaw 23 located opposite one another, as will be set out in greater detail hereinbelow. The first jaw 22 and the second jaw 23 are movable between a gripping position, shown in FIG. 2 and a disengagement position that is not shown. In the gripping position, the first jaw 22 and the second jaw 23 clamp a portion of sheet packaging material therebetween, so that, by advancing the first jaw 22 and the second jaw 23 along the advancement direction F, the sheet packaging material is simultaneously advanced along the advancement direction F. In the disengagement position, the first jaw 22 and the second jaw 23 are spaced apart from one another, so that the sheet packaging material can be moved relative to the first jaw 22 and to the second jaw 23.

The first jaw 22 and the second jaw 23 of each pair 24 are configured to be advanced in the advancement direction F by a driving device that is not shown. The driving device may comprise, for example, a driving shaft connected to each pair 24 of jaws. In an alternative embodiment, the driving device may comprise a driving chain supporting the first jaws 22 and a further driving chain supporting the second jaws 23. Other kinds of driving device can, as an alternative, be successfully used.

The assembly 20 is intended to receive the sheet packaging material conformed as a continuous web. The assembly 20 comprises a longitudinal sealing device, which is not shown in the drawings, for sealing opposite longitudinal borders of the sheet packaging material, so as to form from the sheet packaging material a continuous tube 15 extending along the advancement direction F. More in detail, the longitudinal sealing device is intended to join the opposite longitudinal borders of the sheet packaging material along a continuous longitudinal sealing band that will define, in the finished package 1, the longitudinal sealing band 13.

The longitudinal sealing device is located upstream of the advancement device 21, so that the advancement device 21 acts on the sheet packaging material when the latter is already conformed as a continuous tube 15.

The assembly 20 may further comprise a filling device that is not shown, for filling the continuous tube 15 with the product that the packages 1 are intended to contain. Also the filling device is located upstream of the advancement device 21 so that, when the continuous tube 15 is gripped by the advancement device 21, the continuous tube 15 is already filled with the product.

A volume defining element, particularly conformed as a half-shell 25, is connected to each jaw 22, 23 of each pair 24. In particular, each half-shell 25 may be hinged or pivotally connected, for example at a lower end thereof, to the corresponding jaw.

As will be better described below, the half-shells 25 may exert a preliminary forming action on the continuous tube 15, by folding the sheet packaging material forming the continuous tube 15 along some crease lines obtained on the sheet packaging material.

The advancement device 21, which comprises the jaws 22, 24 and the corresponding half-shells 25, is therefore configured not only to advance the sheet packaging material along the advancement direction F, but also to form the sheet packaging material by starting to fold the latter. The advancement device 21 can thus be considered as an advancement and forming device.

The half-shells 25 connected to the jaws of a pair 24 are operable between an active position, shown in the lower part of FIG. 2, and an inactive position shown in the upper part of FIG. 2. In the active position, the half-shells 25 are close to one another and interact with the continuous tube 15 so as to squeeze the latter and isolate a preset volume inside each sealed packaging unit 14. This preset volume corresponds to the quantity of product that will be contained inside each package 1. In the active position, the half-shells 25 may further exert a preliminary folding action on the continuous tube 15, by acting on a plurality of longitudinal crease lines of the packaging material forming the continuous tube 15.

In the inactive position, the half-shells 25 are spaced apart from one another and do not interact with the continuous tube 15.

In the example shown, the half-shells 25 move from the active position to the inactive position by rotating around a respective pivot point relative to the corresponding jaw 22, 23. The active position can be considered as a closed position of the half-shells 25, whereas the inactive position may be considered as an open position of the half-shells 25.

Each half-shell 25 has a concave cross-section in a plane perpendicular to the advancement direction F. Hence, when the half-shells 25 connected to the jaws of a pair 24 are in the active position, the continuous tube 15 is encircled by the half-shells 25.

The packaging material forming the continuous tube 15 is provided with a plurality of pouring spouts 10 of respective opening devices 9. The necks 11 of consecutive pouring spouts 10 are equally spaced along the advancement direction F.

Consecutive pouring spouts 10 are aligned along the advancement direction F, so that, after the continuous tube 15 has been formed, all the pouring spouts 10 are located on the same side of the continuous tube 15. In particular, on the continuous tube 15 two opposite main sides may be defined, namely a side 27 and a further side 28. The longitudinal sealing band 13 is located on the side 27 of the continuous tube 15, whereas the pouring spouts 10 are located on the further side 28 of the continuous tube 15. Hence, the longitudinal sealing band 13 and the pouring spouts 10 are located on opposite sides of the continuous tube 15.

The assembly 20 further comprises at least one transverse sealing device 29 for sealing the continuous tube 15 transversely, in particular perpendicularly, to the advancement direction F. More in detail, two transverse sealing devices 29 are provided, arranged in sequence along the advancement direction F at a distance from one another. The transverse sealing devices 29 are configured to join, by sealing, the opposite sides 27, 28 of the continuous tube 15 respectively along the top transverse sealing band 6 and the bottom transverse sealing band. The continuous tube 15 is thus closed at its opposite ends, so that a sealed packaging unit 14 can be defined.

Figure 3:
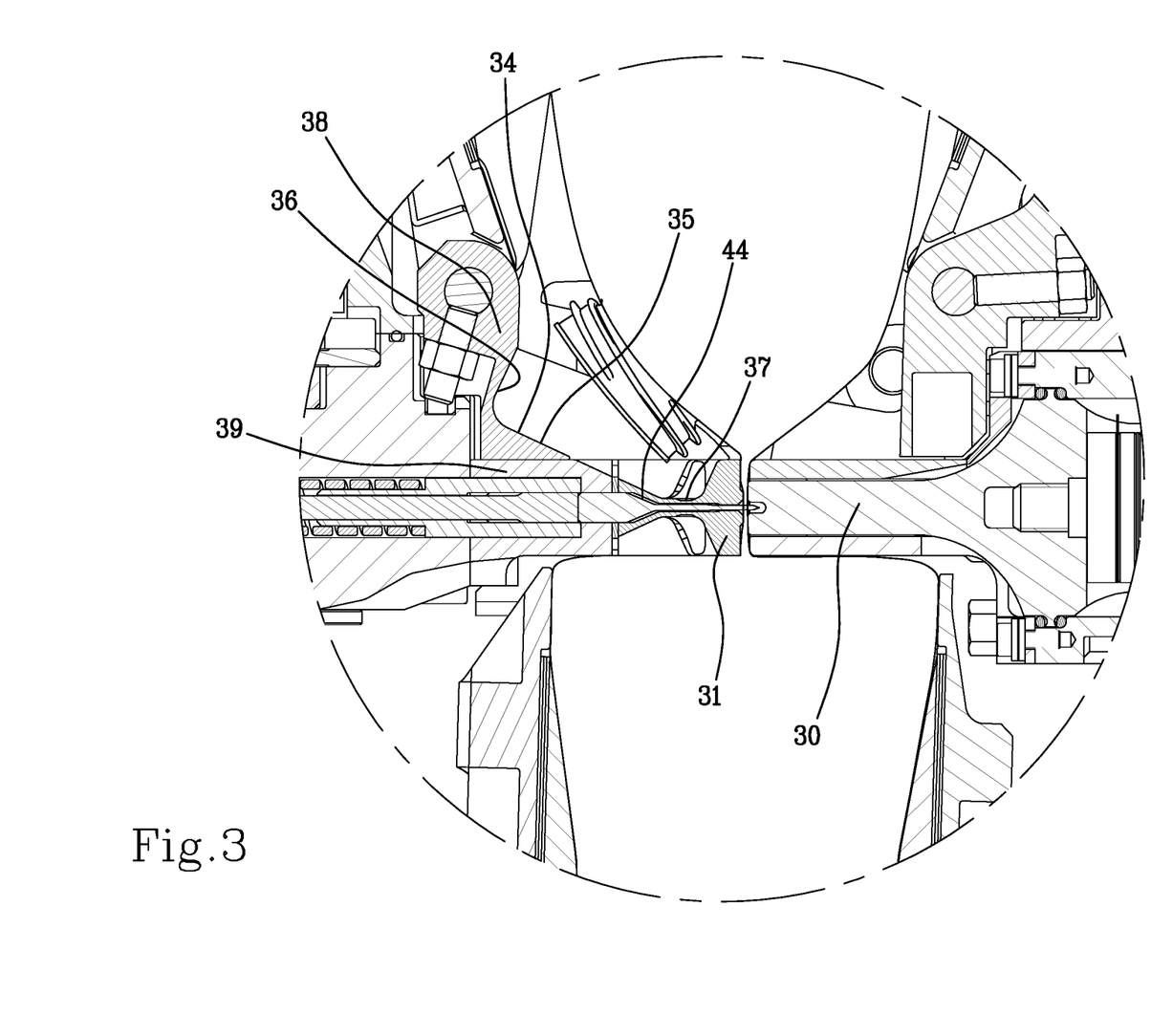
FIG. 3 is an enlarged view of detail A of FIG. 2.
Figure 4:
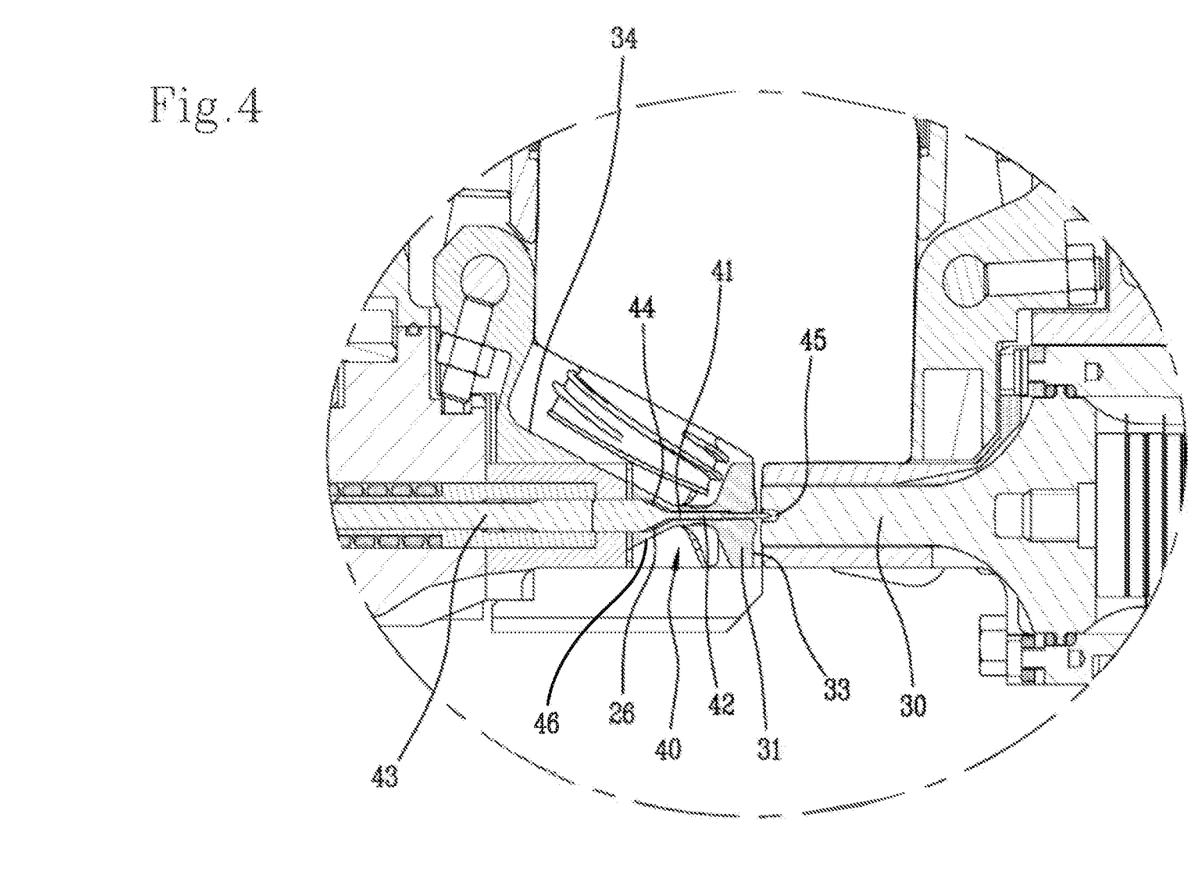
FIG. 4 is an enlarged view of detail B of FIG. 2.

As better shown in FIGS. 3 and 4, each transverse sealing device 29 comprises a sealing element 30 for exerting a sealing action on the packaging material forming the continuous tube 15. Each transverse sealing device 29 further comprises an abutment element 31 against which the packaging material forming the continuous tube 15 may abut during sealing, i.e. while the sealing element 30 interacts with the packaging material.

In the example shown, each transverse sealing device 29 is an ultrasonic sealing device. The sealing element 30 is therefore a sonotrode for creating ultrasonic vibrations thereby generating vibrational energy, which is then applied to the packaging material forming the continuous tube 15. A transducer 32, for example of the piezoelectric type, is attached to the sealing element 30 for causing the latter to vibrate.

In an alternative embodiment, a different kind of transverse sealing device 29 might be used, for example of the induction sealing type, in which case the sealing element 30 would be an electric induction generating element for induction sealing the packaging material forming the continuous tube 15. In this case, the abutment element 31 is made of a resilient material and is delimited by a flat surface facing the continuous tube 15.

In the example shown, the abutment element 31 faces the sealing element 29 and is delimited by an abutment surface 33, arranged substantially along the advancement direction F. The packaging material is intended to be pressed against the abutment surface 33 by the sealing element 30. In the example shown, the abutment surface 33 is not perfectly flat, but is delimited by a wavy profile for better adapting to the conformation of the overlapping ends of packaging material that are sealed together by the transverse sealing device 29.

As already mentioned, the sealing element 30 faces the abutment element 31. The packaging material forming the continuous tube 15 is interposed between the sealing element 30 and the abutment element 31 during sealing. To this end, the sealing element 30 and the abutment element 31 are located on opposite sides of the continuous tube 15.

More in detail, as shown in FIGS. 2, 3 and 4, the sealing element 30 is so positioned as to face, during use, the longitudinal sealing band 13 on the continuous tube 15. In other words, the sealing element 30 is configured to act on the continuous tube 15 from the side 27.

The abutment element 31 is instead positioned so as to face, during use, the side of the continuous tube 15 that is free of the longitudinal sealing band 13. In other words, the abutment element 31 is configured to interact with the continuous tube from the further side 28.

In the example shown, in which the continuous tube 15 is provided with a plurality of pouring spouts 10, the abutment element 31 therefore faces, during use, the side of the continuous tube 15 on which the pouring spouts 10 are applied.

The conformation of the assembly 20 shown in FIGS. 2 to 4 may nevertheless in principle be used even if no pouring spouts 10 are provided on the sheet packaging material, i.e. if the packages 1 intended to be formed do not comprise an opening device 9.

The sealing element 30 and the abutment element 31 are movable relative to one another between a sealing position, shown in FIGS. 2 to 4, and a passive position that is not shown. In the sealing position, the sealing element 30 and the abutment element 31 are close to one another and actively interact with the packaging material forming the continuous tube 15 in order to seal facing portions of the packaging material. In the example shown, the packaging material forming the continuous tube 15 is pinched between the sealing element 30 and the abutment element 31 in the sealing position. In the passive position, the sealing element 30 and the abutment element 31 are spaced apart from one another, so as not to interfere with the continuous tube 15.

The sealing element 30 and the abutment element 31 may be integrated in the gripping jaws of a pair 24. More in detail, the sealing element 30 may be included in the first jaw 22, whereas the abutment element 31 may be supported by the second jaw 23. In this case, the sealing element 30 and the abutment element 31 are arranged in the sealing position while the jaws of the corresponding pair 24 are arranged in the gripping position. On the other hand, when the jaws of the corresponding pair 24 are in the disengagement position, the sealing element 30 and the abutment element 31 are located in the passive position.

In order not to interfere with the necks 11 during sealing, the second jaw 23 is provided with a recess 34 for housing a neck 11 when the packaging material forming the continuous tube 15 is pressed between the abutment element 31 and the sealing element 30. The recess 34 may have a substantially circular or oval shape, when seen in plan view. The diameter of the recess 34 is greater than the diameter of the neck 11, so as to avoid risks of interference between the neck 11 and the walls of the recess 34, even if there are differences in position between consecutive necks 11 applied to a sheet packaging material.

The recess 34 is obtained in a surface of the second jaw 23 facing the neck 11, i.e. (in the example shown) on an upper surface of the second jaw 23.

More in detail, a portion of the recess 34 that, in use, is located near the continuous tube 15, may be obtained in the abutment element 31. A further portion of the recess 34 that, in use, is located far from the continuous tube 15, may be obtained in a component 38 of the second jaw 23. The half-shell 25 connected to the second jaw 23 is hinged to the component 38. An intermediate portion of the recess 34, interposed between the above mentioned portion and further portion, may be made in a supporting component 39 of the second jaw 23, which supports the abutment element 31.

As shown in FIG. 3, the recess 34 may be delimited by a bottom surface 35, which is substantially parallel to an edge 12 of the neck 11, in a configuration in which the neck 11 is substantially completely received inside the recess 34. The recess 34 may be further delimited by a side surface 36, which is substantially perpendicular to the bottom surface 35 and hence substantially parallel to a lateral surface of the neck 11.

A connection surface 37 may delimit the recess 34 at a location interposed between the bottom surface 35 and the side surface 36. The connection surface 37 is arranged near the abutment element 31. Owing to the connection surface 37, the recess 34 has a non-symmetrical configuration relative to an axis around which the side surface 36 extends. In particular, the connection surface 37 defines a part of the recess 34 that protrudes into the bottom surface 35, near the abutment element 31, i.e. in a portion of the bottom surface 35 nearest to the continuous tube 15. This part of the recess 34 ensures that interference between the second jaw 23 and the neck 10 is avoided, in any position in which the neck 10 may be while the continuous tube 15 is folded and sealed.

The assembly 20 may further comprise a cutting device 40 for cutting the continuous tube 15 at equidistant lengths, so as to separate the sealed packaging units 14 one from another. The cutting device 40 is situated between recess 34 and a second recess 46 located on a downstream surface of abutment element 31 and comprises a cutting element, for example a blade 41 for interfering with the packaging material forming the continuous tube and thereby cut the latter. The blade 41 is configured to cut the packaging material at the transverse sealing band created by the transverse sealing device 29. More in detail, the blade 41 is configured to divide the transverse sealing band in two portions, thereby originating the top transverse sealing band 6 of a first sealed packaging unit 14 intended to form a package 1 and the bottom transverse sealing band of a second sealed packaging unit 14 adjacent to the first sealed packaging unit 14.

The blade 41 is at least partially housed in the abutment element 31. Hence, the blade 41 is so positioned as to face the further side 28 of the packaging material, i.e. the side of the continuous tube 15 opposite the longitudinal sealing band.

The blade 41 comprises a thinned portion 42 for interacting with the packaging material in order to cut the latter and a thickened portion 43 from which the thinned portion 42 protrudes. A joining surface 44 is interposed between the thinned portion 42 and the thickened portion 43. The joining surface 44 connects the thinned portion 42 to the thickened portion 43. The joining surface 44 is adjacent to the recess 34, particularly to the bottom surface 35 thereof. The joining surface 44 may for example be a flat surface parallel to the bottom surface 35.

Owing to the joining surface 44, the thickness of the blade 41 may be reduced near a cutting edge thereof. The overall dimensions of the blade 41 may therefore be limited, thereby decreasing the space needed to house the blade 41 in the abutment element 31. This allows the recess 34 to be made in the abutment element 31.

In the example shown, the blade 41 is symmetrical relative to a plane perpendicular to the advancement direction F. In addition to the joining surface 44, the blade 41 is therefore delimited by a further joining surface 26, which is symmetrical with respect to the joining surface 44. While the joining surface 44 is adjacent to the recess 34, the further joining surface 26 is arranged on an opposite side with respect to the recess 34. This allows the blade 41 to be more easily manufactured and assembled on the packaging machine.

In an alternative embodiment, the blade 41 may have a shape that is different from the shape shown in FIGS. 2 to 4.

A movement device, which is not shown, is provided for moving the blade 41 between an advanced position, shown in FIGS. 3 and 4, and a retracted position that is not shown. In the advanced position, the blade 41 protrudes from the abutment surface 33 and interferes with the packaging material forming the continuous tube 15, which can thereby be cut. A seat 45 can be provided on the sealing element 30 for housing a cutting end of the blade 41 in the advanced position, i.e. during cutting.

In the retracted position, the blade 41 does not protrude from the abutment surface 33, so that there is no interference between the blade 41 and the packaging material forming the continuous tube 15.

In order to move from the retracted position to the advanced position or vice versa, the blade 41 is displaced in a direction arranged transversely to, in particular perpendicularly to, the advancement direction F.

During operation, the sheet packaging material is folded and sealed parallelly to the advancement direction F by the longitudinal sealing device, so as to form the continuous tube 15. This occurs while the sheet packaging material is being advanced along the advancement direction F by the advancement device 21. In particular, the packaging material forming the continuous tube 15 is successively gripped at two distinct and consecutive locations by the two pairs 24 of gripping jaws, which are in the gripping position and advance the continuous tube 15 along the advancement direction F.

More specifically, when the jaws of a pair 24, in the gripping position, move forwards in the advancement direction F to advance the continuous tube 15, the jaws of the other pair 24, in the disengagement position, move backwards in a direction opposite the advancement direction F, so as to reach a new portion of the continuous tube 15 to be gripped, located upstream of the previously gripped portion.

The filling device introduces the product intended to fill the packages 1 inside the continuous tube 15, before the latter starts to interact with the pairs 24 of jaws.

When a pair 24 of jaws is in the gripping position, the corresponding sealing element 30 and abutment element 31 are brought in the sealing position, in which the sealing element 30 pushes the packaging material against the abutment element 31 and joins facing portions of the packaging material transversely to the advancement direction F. The transverse sealing band is therefore created.

More in detail, the transverse sealing device 29 associated to each pair 24 of jaws forms a corresponding transverse sealing band, so that the two consecutive transverse sealing devices 29, one after the other, seal a portion of the continuous tube 15 at both ends thereof, thereby forming a sealed packaging unit 14.

In the meantime, the blade 41 associated to a pair 24 of jaws is displaced into the advanced position, so as to cut the packaging material forming the continuous tube 15 through the respective transverse sealing band and separate the sealed packaging units 14 one from another. Before sealing the packaging material forming the continuous tube 15 transversely to the advancement direction F, two facing half-shells 25, which were initially in the inactive position as shown in the upper part of FIG. 2, are brought into the active position as shown in the lower part of FIG. 2. The continuous tube 15 is thus squeezed between the two facing half-shells 25, so that a preset volume of filling product can be isolated in each sealed packaging unit 14. Furthermore, the facing half-shells 25 may exert a preliminary folding action on at least some of the crease lines present in the sheet packaging material forming the continuous tube 15.

In order to pass from the inactive position to the active position, the half-shells 25 associated to a pair 24 of jaws are each rotated around the respective pivot point at which each half-shell 25 is hinged to the respective jaw.

When a portion of the continuous tube 15 intended to form a forward end of a sealed packaging unit 14 is gripped by the jaws of a pair 24, the corresponding half-shells 25 are still in the inactive position and a further portion of the continuous tube 15 intended to form a backward end of the sealed packaging unit 14 has not yet been gripped by the respective jaws. This configuration is shown in the upper part of FIG. 2. In this configuration, a forward portion of the neck 10 starts to be received in the recess 34, as shown in FIG. 3.

As two facing half-shells 25 move to the active position, thereby squeezing the portion of the continuous tube 15 interposed therebetween, such portion is deformed by the half-shells 25. The neck 10 is thus pushed more deeply inside the recess 34, until the configuration shown in FIG. 4 is reached. In this configuration, there is no interference between the neck 10 and the walls delimiting the recess 34, so that the neck 10 is neither deformed, nor broken by accidental contacts with the second jaw 23. Deformations of the sealed packaging unit 14 due to excessive pressures exerted thereon are also avoided. At the same time, the functionality of the transverse sealing device 29 and of the cutting device 40, if any, is not jeopardized. In particular, the recess 34 does not affect the mass of the sealing element 30, whose performances can therefore be kept to an optimal level.

The invention claimed is:

1. An assembly for producing sealed packaging units from a sheet packaging material, comprising:
   an advancement device for advancing the sheet packaging material along an advancement direction;
   a transverse sealing device for sealing a continuous tube transversely to the advancement direction and to thereby define a sealed packaging unit, the continuous tube having a longitudinal sealing band that is arranged parallelly to the advancement direction, wherein the longitudinal sealing band is formed by sealing opposite borders of the sheet of packaging material;
   wherein the transverse sealing device comprises a sealing element and an abutment element, respectively located on opposite sides of the continuous tube, that are configured to mutually cooperate during sealing, wherein the sealing element is configured to be located on a side of the continuous tube on which the longitudinal sealing band is located,
   wherein the transverse sealing device is an ultrasonic sealing device and the sealing element is a sonotrode;
   wherein the transverse sealing device has a first recess configured to house, during sealing, a neck of a pouring spout applied to the continuous tube;
   wherein the first recess is located on an upstream surface of the abutment element relative to the advancement direction; and
   wherein the transverse sealing device has a second recess located on a downstream surface of the abutment element relative to the advancement direction.

2. An assembly according to claim 1, wherein the first recess has an asymmetrical surface defined by a part of the first recess protruding towards the abutment element, the first recess configured to avoid interference between the neck and the abutment element during sealing.

3. An assembly according to claim 1, wherein the advancement device comprises a pair of gripping jaws for gripping the continuous tube, the pair of gripping jaws comprising a first jaw including the sealing element and a second jaw including the abutment element.

4. An assembly according to claim 3, wherein the first recess is included in the second jaw.

5. An assembly according to claim 3, and further comprising a pair of half-shells, each connected to a respective gripping jaw, the half-shells being displaceable into an active position to isolate a preset volume inside a portion of the continuous tube intended to define a sealed packaging unit.

6. An assembly according to claim 1, and further comprising a cutting device for cutting the continuous tube to thereby separate consecutive sealed packaging units from the continuous tube.

7. An assembly according to claim 6, wherein the cutting device comprises a blade that is at least partially housed in the abutment element.

8. An assembly according to claim 7, wherein the blade comprises a thinned portion delimited by a cutting edge and a thickened portion from which the thinned portion protrudes.

9. An assembly according to claim 7, wherein the sealing element has a seat facing the blade for receiving a cutting end of the blade during cutting.

10. An assembly according to claim 1, wherein the advancement device is configured to exert a preliminary forming action on the sheet packaging material.

11. An assembly according to claim 1,
    wherein the first recess is delimited by a bottom surface configured to face an edge of the neck, a side surface intended to encircle the neck and situated near the continuous tube, and a connection surface interposed between the bottom surface and the side surface.

12. An assembly for producing sealed packaging units from a sheet packaging material that moves along an advancement direction, the assembly comprising:
- a transverse sealing device for sealing opposite ends of a continuous tube transverse to the advancement direction, the continuous tube having a longitudinal sealing band arranged parallelly to the advancement direction, wherein the longitudinal sealing band is formed by sealing opposite borders of the sheet of packaging material, and wherein the sealing thereby forms a sealed packaging unit,
- wherein the transverse sealing device comprises:
  - a sealing element located on a same side of the continuous tube as which the longitudinal sealing band is located, and
  - an abutment element located on an opposite side of the continuous tube as the sealing element, wherein the sealing element and the abutment element cooperate when sealing ends of the continuous tube when forming the sealed packaging unit;
- wherein the transverse sealing device is an ultrasonic sealing device and the sealing element is a sonotrode;
- wherein the transverse sealing device has a first recess configured to house, during sealing, a neck of a pouring spout applied to the continuous tube;
- wherein the first recess is located on an upstream surface of the abutment element relative to the advancement direction; and
- wherein the transverse sealing device has a second recess located on a downstream surface of the abutment element relative to the advancement direction.

13. An assembly for producing sealed packaging units according to claim 12,
- wherein the first recess is delimited by a bottom surface configured to face an edge of the neck, a side surface intended to encircle the neck and situated near the continuous tube, and a connection surface interposed between the bottom surface and the side surface.

* * * * *